(12) United States Patent
Kato et al.

(10) Patent No.: US 9,885,401 B2
(45) Date of Patent: Feb. 6, 2018

(54) CHAIN GUIDE AND CHAIN TRANSMISSION DEVICE

(71) Applicant: NTN CORPORATION, Osaka (JP)

(72) Inventors: Akio Kato, Shizuoka (JP); Takahiro Yamashita, Shizuoka (JP); Hisataka Hasegawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/100,144

(22) PCT Filed: Nov. 27, 2014

(86) PCT No.: PCT/JP2014/081405
§ 371 (c)(1),
(2) Date: May 27, 2016

(87) PCT Pub. No.: WO2015/080208
PCT Pub. Date: Jun. 4, 2015

(65) Prior Publication Data
US 2017/0037942 A1    Feb. 9, 2017

(30) Foreign Application Priority Data

Nov. 28, 2013 (JP) ................................ 2013-245844

(51) Int. Cl.
*F16H 7/12* (2006.01)
*F16H 7/20* (2006.01)
(Continued)

(52) U.S. Cl.
CPC ................ *F16H 7/20* (2013.01); *F16H 7/06* (2013.01); *F16H 7/08* (2013.01); *F16H 7/18* (2013.01);
(Continued)

(58) Field of Classification Search
CPC .......... F16H 2007/0874; F16H 7/1281; F16H 2007/0893; F16H 2007/081; F01L 1/348
(Continued)

(56) References Cited

U.S. PATENT DOCUMENTS

| 1,016,787 A * | 2/1912 | Sewall | F16H 2007/086 474/109 |
| 1,579,245 A * | 4/1926 | Pennington | B62D 55/108 305/134 |

(Continued)

FOREIGN PATENT DOCUMENTS

| DE | 37 38 895 | 6/1989 |
| JP | 4-3150 | 1/1992 |

(Continued)

OTHER PUBLICATIONS

International Search Report dated Feb. 24, 2015 in International (PCT) Application No. PCT/JP2014/081405.
(Continued)

*Primary Examiner* — Henry Liu
(74) *Attorney, Agent, or Firm* — Wenderoth, Lind & Ponack, L.L.P.

(57) ABSTRACT

A chain guide includes a guide base pivotable about a fulcrum shaft. The fulcrum shaft is between a roller bearing located at an end portion of the guide base, which is closer to the fulcrum shaft, and the center of the guide base in the longitudinal direction of the guide base such that the roller bearing is outside of the fulcrum shaft.

17 Claims, 3 Drawing Sheets

(51) Int. Cl.
*F16H 7/18* (2006.01)
*F16H 7/06* (2006.01)
*F16H 7/08* (2006.01)
*F01L 1/02* (2006.01)
*F01L 1/047* (2006.01)
*F01L 1/34* (2006.01)

(52) U.S. Cl.
CPC .............. *F01L 1/022* (2013.01); *F01L 1/047* (2013.01); *F01L 1/34* (2013.01); *F16H 2007/087* (2013.01); *F16H 2007/0842* (2013.01); *F16H 2007/0893* (2013.01)

(58) Field of Classification Search
USPC ........................................ 474/111, 140, 134
See application file for complete search history.

(56) References Cited

U.S. PATENT DOCUMENTS

| | | | | | |
|---|---|---|---|---|---|
| 2,352,797 | A | * | 7/1944 | Miller | F16H 35/02 474/134 |
| 2,753,812 | A | * | 7/1956 | Wharton | B61D 43/00 105/105 |
| 3,391,807 | A | * | 7/1968 | Buschbom | F16H 7/1281 414/319 |
| 3,441,009 | A | * | 4/1969 | Rafanelli | F01L 1/348 123/90.15 |
| 3,785,219 | A | * | 1/1974 | Anthamatten | B62M 9/16 474/134 |
| 3,817,114 | A | * | 6/1974 | Klee | F16H 7/1281 474/110 |
| 3,941,006 | A | * | 3/1976 | Brodesser | F16H 7/1254 474/132 |
| 4,011,709 | A | * | 3/1977 | Mott | A01D 41/148 56/10.4 |
| 4,141,245 | A | * | 2/1979 | Brandstetter | G01L 3/247 474/109 |
| 4,416,647 | A | * | 11/1983 | White, Jr. | F16H 7/1281 474/134 |
| 4,511,348 | A | * | 4/1985 | Witdoek | F16H 7/12 474/109 |
| 4,525,151 | A | * | 6/1985 | Tomita | F16H 7/1281 123/90.15 |
| 4,530,682 | A | * | 7/1985 | Gruber | F16H 7/0827 474/133 |
| 4,685,429 | A | * | 8/1987 | Oyaizu | F01L 1/02 123/90.15 |
| 4,726,331 | A | * | 2/1988 | Oyaizu | F02B 75/22 123/90.15 |
| 4,758,208 | A | * | 7/1988 | Bartos | F16H 7/1281 474/111 |
| 4,981,116 | A | * | 1/1991 | Trinquard | F02B 67/06 123/90.31 |
| 5,221,236 | A | * | 6/1993 | Raymer | B62M 9/16 474/109 |
| 5,242,331 | A | * | 9/1993 | Konig | F16H 7/02 474/101 |
| 5,776,025 | A | * | 7/1998 | Labudde | F16H 7/1281 474/133 |
| 6,004,237 | A | * | 12/1999 | Lodico | F16H 7/1281 474/117 |
| 6,155,218 | A | * | 12/2000 | Line | F01L 1/348 123/90.15 |
| 6,857,978 | B2 | * | 2/2005 | Polster | F16H 7/1209 474/134 |
| 6,857,979 | B2 | * | 2/2005 | Macnaughton | F16H 7/1218 474/101 |
| 7,678,000 | B2 | * | 3/2010 | Harnetiaux | F16H 7/1281 474/117 |
| 7,913,479 | B2 | * | 3/2011 | Eavenson, Sr. | A01D 34/76 474/135 |
| 9,140,338 | B2 | * | 9/2015 | Serkh | F16H 7/1218 |
| 9,400,046 | B2 | * | 7/2016 | Kato | F16H 7/18 |
| 2003/0176249 | A1 | * | 9/2003 | Polster | F16H 7/1209 474/134 |
| 2003/0224889 | A1 | * | 12/2003 | Luh | F16H 7/1281 474/134 |
| 2011/0294612 | A1 | * | 12/2011 | Kato | F16H 7/08 474/91 |
| 2014/0155208 | A1 | * | 6/2014 | Kato | F02B 67/06 474/111 |
| 2014/0274512 | A1 | * | 9/2014 | Oishi | F16H 7/18 474/139 |

FOREIGN PATENT DOCUMENTS

| | | |
|---|---|---|
| JP | 2013-24367 | 2/2013 |
| JP | 2013-29155 | 2/2013 |
| JP | 2013-79694 | 5/2013 |
| KR | 10-2009-0061261 | 6/2009 |
| WO | 2005/080770 | 9/2005 |
| WO | 2010/090139 | 8/2010 |

OTHER PUBLICATIONS

Written Opinion of the International Searching Authority dated Feb. 24, 2015 in International (PCT) Application No. PCT/JP2014/081405, with English translation.
Extended European Search Report dated Nov. 18, 2016 in corresponding European Application No. 14866145.7.

\* cited by examiner

CHAIN GUIDE AND CHAIN TRANSMISSION DEVICE

TECHNICAL FIELD

The present invention relates to a chain guide used for adjusting the tension of a chain or for adjusting the movement of a chain, and to a chain transmission device in which this chain guide is used.

BACKGROUND ART

In a chain transmission device including a driving sprocket attached to a crankshaft, driven sprockets attached to respective camshafts, and a timing chain (hereinafter, simply referred to as "chain") made of metal, and trained around the driving sprocket and the driven sprockets, the chain transmission device being used for driving the camshafts, a pivotable chain guide is provided on one side of the loose side chain portion of the chain so as to extend along the direction in which the chain moves, and an adjustment force is applied to the pivotable end portion of the chain guide by a chain tensioner such that the chain becomes tensioned, thereby preventing the chain form becoming loose or flapping.

Also, a fixed chain guide is mounted to the tension side chain portion of the chain such that both end portions of the fixed chain guide are supported by respective supporting members. The fixed chain guide guides the movement of the chain, while preventing the chain from flapping.

As the chain guide for adjusting the tension of the chain or the chain guide for guiding the movement of the chain, a sliding-type chain guide is known which guides a chain by coming into sliding contact with the chain. However, in such a sliding-type chain guide, there is the problem that the resistance to the movement of the chain is large so that the transmission loss of torque is large.

In order to overcome such a problem, the applicant of the present application has proposed, in PCT International Publication No. 2010/090139, a chain guide including a guide base made of synthetic resin, and elongated in the direction in which a chain moves, a plurality of roller shafts arranged so as to draw a curved line, and each having both end portions supported by the guide base, and rollers comprising roller bearings, and being rotatably supported by the respective roller shafts, the rollers movably guiding the chain.

Since the rollers roll to guide the chain in the above chain guide, the resistance of the movement of the chain is small so that the transmission loss of torque is small.

Problems to be Solved by the Invention

In the chain guide disclosed in the above Patent document 1, both end portions of the guide base in the longitudinal direction of the guide base are supported by respective supporting members, and the movement of the chain is guided by the plurality of rollers arranged between the supporting members. Therefore, large rotation moment is applied to the center of the guide base in the longitudinal direction due to the pressing force applied to the rollers from the chain, so that the guide base is likely to bend. The bend of the guide base causes a vibration and a noise to occur, thereby making a driver feel uncomfortable.

SUMMARY OF THE INVENTION

It is an object of the present invention to prevent a guide base from bending so as to reduce a vibration and a noise.

Means for Solving the Problems

In order to achieve the above object, the present invention provides a tension-adjusting chain guide comprising: a guide base having a curved shape, and mounted along a direction in which a chain for transmitting torque moves; and a plurality of rotatable rollers mounted to the guide base so as to be spaced apart from each other in a longitudinal direction of the guide base, wherein the guide base is supported at one end portion of the guide base by a fulcrum shaft so as to be pivotable about the fulcrum shaft, and wherein an adjustment force is applied to a remote end portion of the guide base, which is remote from the fulcrum shaft, by a chain tensioner such that the rollers press the chain, and can guide the chain by rolling, characterized in that the fulcrum shaft, about which the guide base is pivotable, is arranged between one of the rollers located at one of two opposite ends of the guide base that is closer to the fulcrum shaft than is the other of the two opposite ends, and a center of the guide base in the longitudinal direction such that said one of the rollers is arranged outside of the fulcrum shaft.

As described above, by arranging one of the rollers outside of the fulcrum shaft, about which the guide base is pivotable, when the movement of the chain is guided such that a pressing force is applied to the rollers from the chain, the rotation moment applied to one of the rollers arranged outside of the fulcrum shaft acts to alleviate the rotation moment applied to some of the rollers arranged between the fulcrum shaft and the portion of the guide base to which the adjustment force is applied by the chain tensioner. Therefore, the guise base is less likely to bend between the fulcrum shaft and the portion of the guide base to which the adjustment force is applied by the chain tensioner.

If a portion of the guide base to which the adjustment force is applied by the chain tensioner is arranged between one of the rollers located at the other of the two opposite ends of the guide base and the center of the guide base in the longitudinal direction such that said one of the rollers located at the other of the two opposite ends is arranged outside of the portion of the guide base to which the adjustment force is applied, the rotation moment applied to said one of the rollers located at the other of the two opposite ends acts to further alleviate the rotation moment applied to some of the rollers arranged between the fulcrum shaft and the portion of the guide base to which the adjustment force is applied by the chain tensioner. Therefore, the guise base is much less likely to bend.

In order to achieve the above object, the present invention provides a movement-guiding chain guide comprising: a guide base having a curved shape, and mounted along a direction in which a chain for transmitting torque moves; and a plurality of rotatable rollers mounted to the guide base so as to be spaced apart from each other in a longitudinal direction of the guide base, wherein supporting members support respective two end portions of the guide base such that the rollers can guide the chain by rolling, characterized in that at least one of the supporting members, which support the respective two end portions of the guide base, is arranged between one of the rollers located at one of two opposite ends of the guide base which is on a side of said at least one of the supporting members, and a center of the guide base in the longitudinal direction such that said one of the rollers is arranged outside of said at least one of the supporting members.

In the above movement-guiding chain guide as well, the rotation moment applied to one of the rollers arranged outside of one of the supporting members and one of the rollers arranged outside of the other supporting member acts to alleviate the rotation moment applied to some of the rollers arranged between the supporting shafts. Therefore, the guise base is less likely to bend.

If the guide base is configured to satisfy the formula "H>W", where W is a distance between two opposite side surfaces of the guide base, and H is a radial height of the guide base, the guide base is more rigid than a guide base configured to satisfy the formula "H<W". As a result thereof, the chain guide is less likely to bend.

The present invention also provides a chain transmission device comprising: a driving sprocket; a driven sprocket; a timing chain having a loose side chain portion, and trained around the driving sprocket and the driven sprocket; and a pivotable chain guide provided on one side of the loose side chain portion so as to guide a movement of the timing chain, characterized in that the chain guide comprises the above tension-adjusting chain guide.

In the chain transmission device configured as above, by providing a fixed chain guide for guiding the movement of the chain on one side of the tension side chain portion of the chain, and using the above movement-guiding chain guide as the fixed chain guide, the chain is less likely to flap.

Effects of the Invention

In the present invention, as described above, since one of the rollers is arranged outside of the fulcrum shaft, about which the pivotally supported guide base is pivotable, and one of the rollers is arranged outside of at least one of the supporting members of the fixed guide base, the guise bases are less likely to bend, thus making it possible to reduce a vibration and a noise.

BEST MODE FOR CARRYING OUT THE INVENTION

Figure 1:
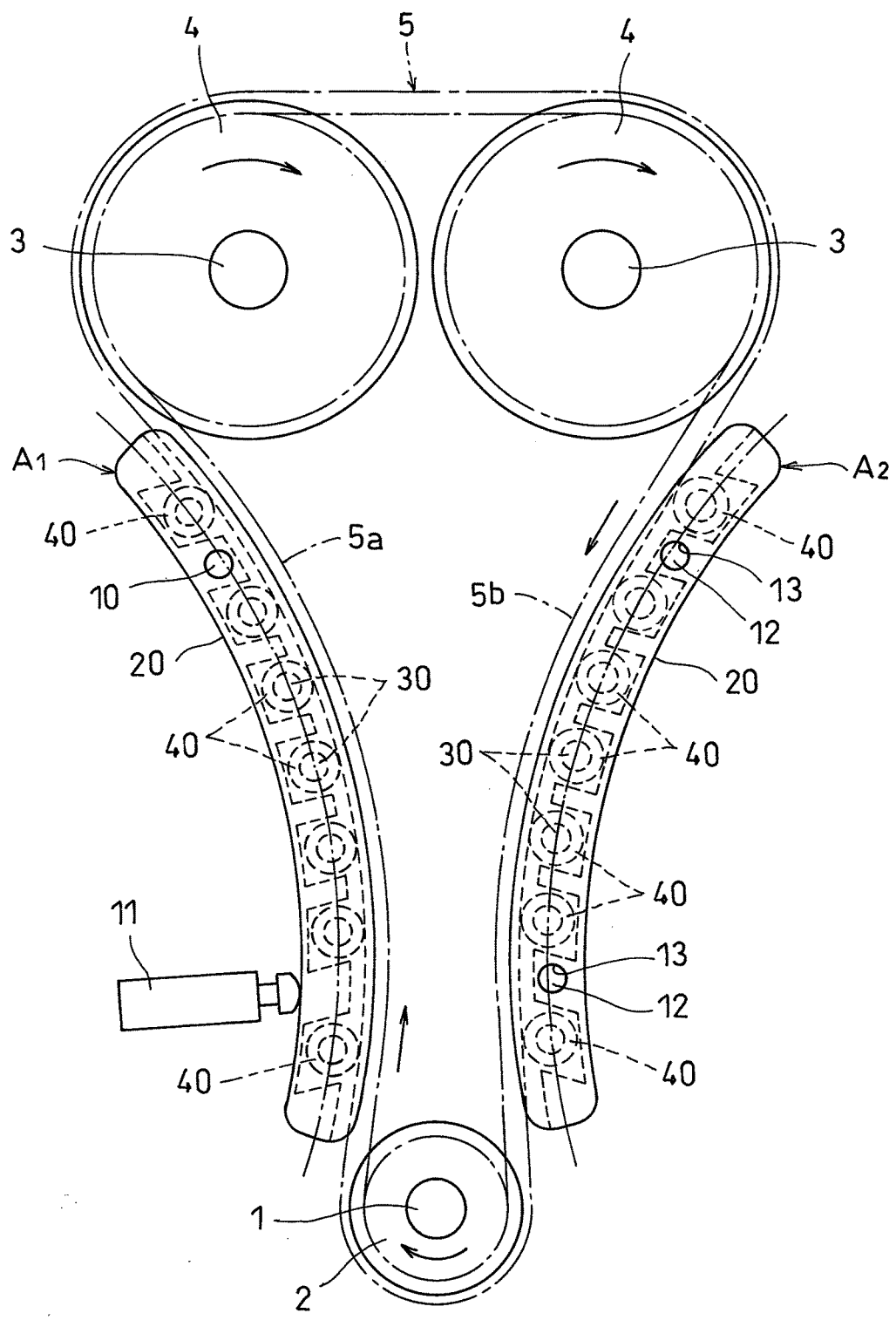
FIG. 1 is a schematic diagram of a chain transmission device according to an embodiment of the present invention.

The chain transmission device according to the embodiment of the present invention is now described with reference to the drawings. As illustrated in FIG. 1, this chain transmission device includes a driving sprocket 2 attached to an end portion of a crankshaft 1, driven sprockets 4 attached to end portions of respective camshafts 3, and a timing chain 5 trained around the driving sprocket 2 and the driven sprockets 4, and is used for driving the camshafts.

The timing chain 5 may be a roller chain or a silent chain.

The crankshaft 1 rotates in the direction indicated by the arrow in FIG. 1. Due to the rotation of the crankshaft 1, the timing chain 5 (hereinafter, simply referred to as "chain") moves in the direction indicated by the arrow in FIG. 1. At this time, the portion of the chain 5 moving upwardly becomes loose, and the portion of the chain 5 moving downwardly becomes tensioned. These portions are therefore called "loose side chain portion 5a" and "tension side chain portion 5b", respectively. A tension-adjusting chain guide $A_1$ for adjusting the tension of the chain 5 is provided on one side of the loose side chain portion 5a.

The tension-adjusting chain guide $A_1$ is elongated in the direction in which the chain 5 moves. The upper end portion of the chain guide $A_1$ is supported by a fulcrum shaft 10 protruding from an engine block such that the chain guide $A_1$ is pivotable about the fulcrum shaft 10. An adjustment force is applied to the lower end portion of the chain guide $A_1$, which is remote from the fulcrum shaft 10, by a chain tensioner 11 such that the chain guide $A_1$ is pressed against the loose side chain portion 5a.

A movement-guiding chain guide $A_2$ for guiding the movement of the chain 5 is provided on one side of the tension side chain portion 5b of the chain 5. As with the pivotable chain guide $A_1$, the movement-guiding chain guide $A_2$ is also elongated in the direction in which the chain 5 moves. Both end portions of the chain guide $A_2$ are fixed in position by means of the fastening of respective bolts 12 (supporting members) screwed into the engine block, so that the chain guide $A_2$ can guide the movement of the chain 5.

The tension-adjusting chain guide $A_1$ is substantially identical in structure to the movement-guiding chain guide $A_2$, but differs from the movement-guiding chain guide $A_2$ in that the tension-adjusting chain guide $A_1$ is formed at one end portion thereof with an insertion hole 23 in which the fulcrum shaft 10 is inserted, whereas the movement-guiding chain guide $A_2$ is formed at the respective end portions thereof with insertion holes 13 in which the respective bolts 12 are inserted.

Therefore, the structure of only the tension-adjusting chain guide $A_1$ is now described. As for the elements of the chain guide $A_2$ corresponding to those of the chain guide $A_1$, the same reference numerals used in the chain guide $A_1$ are used, and their description is omitted.

Figure 2:
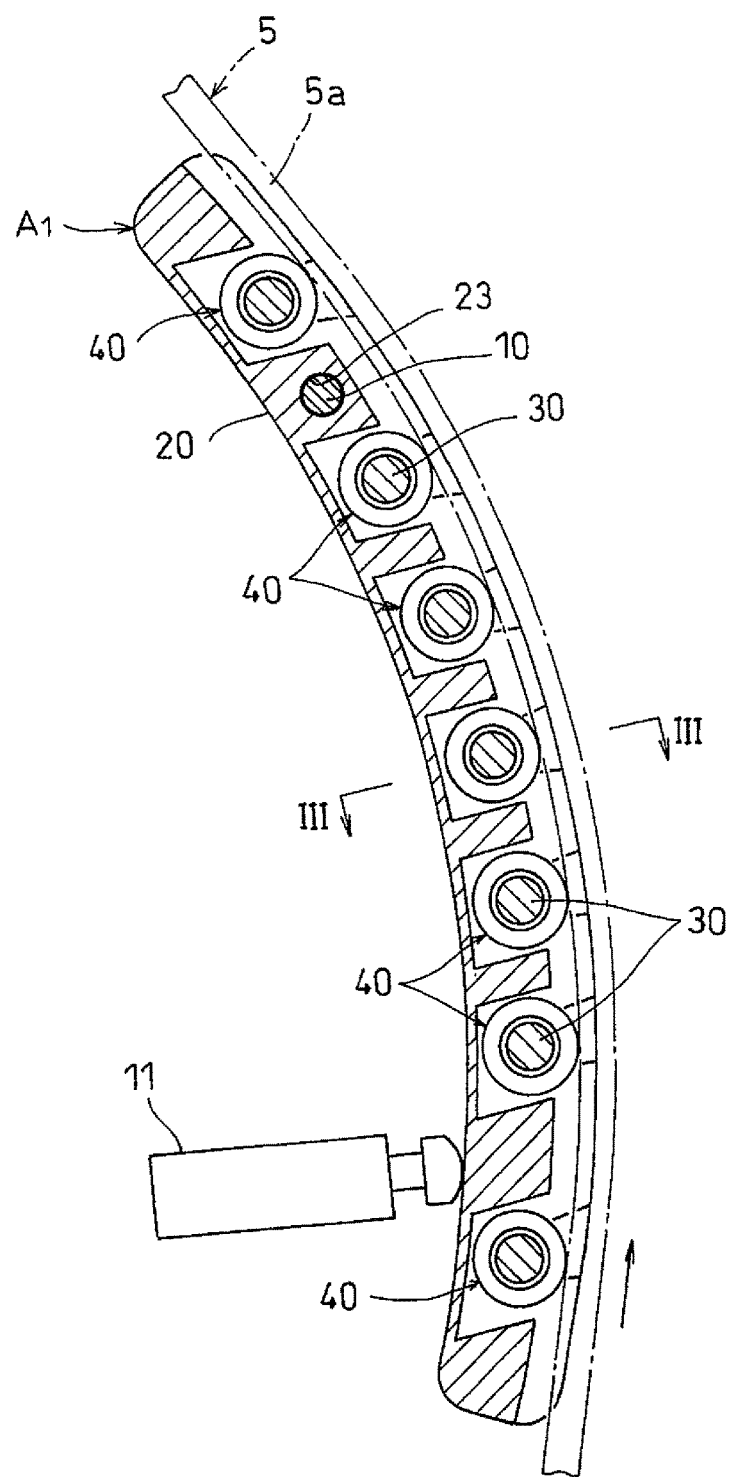
FIG. 2 is a longitudinal sectional view of the chain guide illustrated in FIG. 1.
Figure 3:
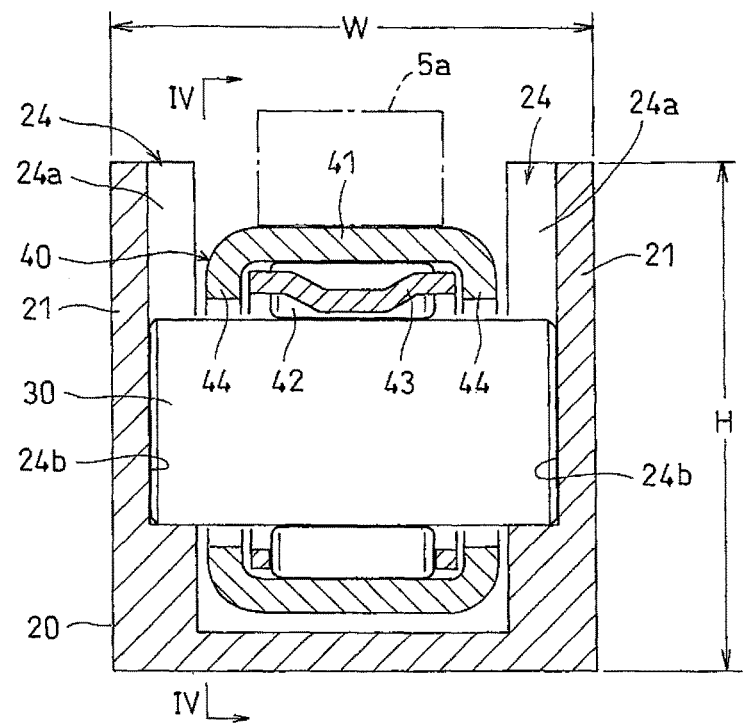
FIG. 3 is a sectional view taken along line III-III of FIG. 2.
Figure 4:
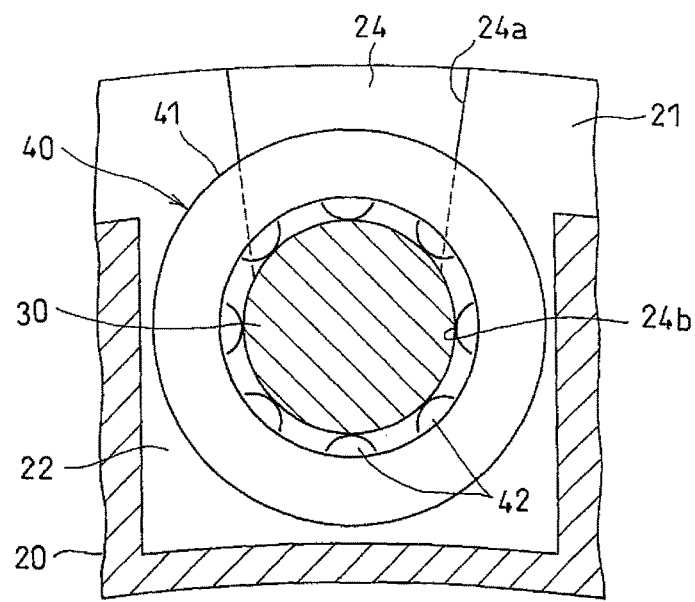
FIG. 4 is a sectional view taken along line IV-IV of FIG. 3.

As illustrated in FIGS. 2 to 4, the chain guide $A_1$ includes a guide base 20 elongated in the direction in which the chain 5 moves, a plurality of roller shafts 30 mounted to the guide base 20 so as to be spaced apart from each other in the longitudinal direction of the guide base 20, and a plurality of rollers 40 rotatably supported by the respective roller shafts 30, and configured to guide the chain 5.

The guide base 20 has a curved shape, and includes an opposed pair of side plates 21 provided on the respective sides of the surface of the guide base 20 opposed to the chain 5. A plurality of roller receiving recesses 22 are formed between the pair of side plates 21 so as to be spaced apart from each other in the longitudinal direction of the guide base 20.

The guide base 20 is further formed at the upper end portion thereof with the above-mentioned insertion hole 23, in which the fulcrum shaft 10 is inserted.

Each roller receiving recess 22 has opposed inner side surfaces formed with shaft engaging portions 24 supporting the respective end portions of each roller shaft 30.

The shaft engaging portions 24 of each roller receiving recess 22 are open to the outer side surfaces of the respective side plates 21 opposed to the chain 5, and are each constituted by a tapered groove section 24a having a wide open end, and a circular, shaft supporting section 24b communicating with the narrow end of the tapered groove section 24a.

Each end portion of the roller shaft 30 is passed through the tapered groove section 24a and fitted into the shaft supporting section 24b, and is unrotatably supported in the shaft supporting section 24b. The narrow portions of the tapered groove sections 24a have diameters smaller than those of the roller shafts 30, so that the narrow portions of the respective tapered groove sections 24a prevent the roller shafts 30 from being pulled out of the shaft supporting sections 24b.

In the embodiment, the shaft engaging portions 24 are arranged such that the centers of the respective shaft supporting sections 24b lie on a convex circular arc, but may be arranged such that the centers of the respective shaft supporting sections 24b lie on a curved line other than a convex circular arc.

The guide base 20 is made of a synthetic resin, preferably a synthetic resin having sufficient oil resistance, weather resistance, and strength, such as polyamide 46 (PA46) or polyamide 66 (PA66). In order to further increase the mechanical strength of such synthetic resin, it is preferable to reinforce such synthetic resin with glass fiber.

As illustrated in FIGS. 3 and 4, the roller shafts 30 are straight-shaped shafts, and made of SUJ2 or SC material. Heat treatment is performed to the roller shafts 30 so as to increase their hardness, thereby increasing their wear resistance. As such heat treatment, though bright quenching is used in this embodiment, high frequency quenching, carburizing and quenching, or carbonitriding may be used.

The rollers 40 are rotatably supported by the respective roller shafts 30. The rollers 40 are roller bearings each including an outer race 41, a plurality of roller elements 42 mounted inside of the outer race 41, and a retainer 43 retaining the roller elements 42.

The outer race 41 is a shell-type outer race formed by drawing a metallic plate such as SPC or SCM. Heat treatment is performed to the outer race 41 so as to increase its hardness. The shell-type outer race 41 is formed at the respective end portions thereof with inwardly extending flanges 44 for preventing the retainer 43 from being pulled out. In order to enable the roller bearings 40 to be easily assembled, the inwardly extending flanges 44 are bent after mounting in position the retainer 43, retaining the roller elements 42.

The roller bearings 40 may be needle roller bearings or cylindrical roller bearings.

As illustrated in FIG. 1, in the movement-guiding chain guide $A_2$, the above-mentioned bolts 12 are inserted in the above-mentioned insertion holes 13, formed at the respective end portions of the guide base 20, and are fastened to the engine block, thereby supporting the respective end portions of the guide base 20.

In the chain transmission device configured as described above, the rotation of the crankshaft 1 is transmitted to the camshafts 3 by the movement of chain 5, trained around the driving sprocket 2 and the driven sprockets 4.

While torque is being transmitted from the crankshaft 1 to the camshafts 3, when the tension of the chain 5 changes due to a load change, the chain tensioner 11 is activated so as to absorb the tension change of the chain 5. Therefore, the tension of the chain 5 is always maintained within a predetermined range.

When torque is transmitted by the movement of the chain 5, the roller bearings 40 (rollers 40), mounted to the chain guides $A_1$ and $A_2$, roll due to the contact with the chain 5, thereby guiding the chain 5.

When the roller bearings 40, mounted to the chain guides $A_1$ and $A_2$, guide the chain 5 by rolling, a pressing force is applied to the roller bearings 40 from the chain 5 which is in a tense state.

In the tension-adjusting chain guide $A_1$, if all of the roller bearings 40 are arranged between the fulcrum shaft 10, which pivotally supports the guide base 20, and the portion of the guide base 20 to which an adjustment force is applied by the chain tensioner 11, due to the pressing force applied to the roller bearings 40 from the chain 5, extremely large rotation moment is intermittently applied to the center of the guide base 20 in the longitudinal direction of the guide base 20, and thus the guide base 20 tends to bend largely, thereby causing a vibration and a noise to occur.

Similarly, in the movement-guiding chain guide $A_2$, if all of the roller bearings 40 are arranged between the bolts 12 (a pair of supporting members), which support the guide base 20, due to the pressing force applied to the roller bearings 40 from the chain 5, rotation moment is intermittently applied to the center of the guide base 20 in the longitudinal direction of the guide base 20, and thus the guide base 20 tends to bend largely, thereby causing a vibration and a noise to occur.

In order to overcome such a problem, the tension-adjusting chain guide $A_1$ is configured such that as illustrated in FIG. 2, the fulcrum shaft 10 is arranged between the roller bearing 40 located at one end of the guide base 20 closer to the fulcrum shaft 10 than is the other end of the guide base 20, and the roller bearing 40 adjacent to this roller bearing 40, in other words, one of the roller bearings 40 is arranged outside of the fulcrum shaft 10, and further such that the portion of the guide base 20 to which the adjustment force is applied by the chain tensioner 11 is arranged between the roller bearing 40 located at the other end of the chain guide 20 and the roller bearing 40 adjacent to this roller bearing 40, in other words, one of the roller bearing 40 is arranged outside of the portion of the guide base 20 to which the adjustment force is applied.

As described above, in the tension-adjusting chain guide $A_1$, by arranging one of the roller bearings 40 outside of the fulcrum shaft 10, and further arranging one of the rollers 40 outside of the portion of the guide base 20 to which the adjustment force is applied by the chain tensioner 11, since the rotation moment applied to these two roller bearings 40 due to the pressing force from the chain 5 acts to alleviate the rotation moment applied to the remaining roller bearings 40, the guise base 20 is less likely to bend, thus making it possible to reduce a vibration and a noise.

In FIG. 2, one of the roller bearings 40 is arranged outside of the fulcrum shaft 10, and further one of the roller bearings 40 is arranged outside of the portion of the guide base 20 to which the adjustment force is applied by the chain tensioner 11. However, two or more of the rolling bearings 40 may be arranged outside of one or either of the fulcrum shaft 10 and the portion of the guide base 20 to which the adjustment force is applied.

Similarly, the movement-guiding chain guide $A_2$ is configured such that as illustrated in FIG. 1, one of the roller bearings 40 is arranged outside of one of the bolts 12 (a pair of supporting members), which support the respective end portions of the guide base 20, and further one of the roller bearings 40 is arranged outside of the other bolt 12.

As described above, in the movement-guiding chain guide $A_2$, by arranging at least one of the roller bearings 40 at the end portion of the guide base 20 located outside of the bolt 12 close to the driving sprocket 2, and further arranging at least one of the roller bearings 40 at the end portion of the guide base 20 located outside of the bolt 12 close to the right driven sprocket 4, since the rotation moment applied to these roller bearings 40 due to the pressing force from the chain 5 acts to alleviate the rotation moment applied to the remaining roller bearings 40, as in the chain guide $A_1$, the guise base 20 is less likely to bend, thus making it possible to reduce a vibration and a noise.

In FIG. 1, though one of the roller bearings 40 is arranged outside of one of the bolts 12, and further one of the roller bearings 40 is arranged outside of the other bolt 12, two or more of the roller bearings 40 may be provided outside of one or either of the bolts 12.

Since, as illustrated in FIG. 3, the guide base 20 is configured to satisfy the formula "H>W", where W is the width/distance between both side surfaces of the guide base 20, and H is the radial height of the guise base 20, the guide base 20 is more rigid than a guide base configured to satisfy the formula "H<W". As a result thereof, the chain guide 20 is less likely to bend.

DESCRIPTION OF REFERENCE NUMERALS $A_1$: chain guide
$A_2$: chain guide
2: driving sprocket
4: driven sprocket
5: timing chain (chain for transmitting torque)
10: fulcrum shaft
11: chain tensioner
12: bolt (supporting member)
20: guide base
30: roller shaft
40: roller bearing (roller)

The invention claimed is:

1. A chain guide comprising:
a guide base having a curved shape, and being mounted along a direction in which a chain for transmitting torque is configured to move; and
a plurality of rotatable rollers mounted to the guide base so as to be spaced apart from each other in a longitudinal direction of the guide base,
wherein one end portion of the guide base is supported by a fulcrum shaft such that the guide base is pivotable about the fulcrum shaft,
wherein a remote end portion of the guide base, which is remote from the fulcrum shaft, is configured to receive an adjustment force from a chain tensioner such that the rotatable rollers press the chain, and can guide the chain by rolling,
wherein the fulcrum shaft is between one of the rotatable rollers at one of two opposite ends of the guide base that is closer to the fulcrum shaft than the other of the two opposite ends of the guide base, and a center of the guide base in the longitudinal direction such that the one of the rotatable rollers is outside of the fulcrum shaft,
wherein each of the rotatable rollers comprises a roller bearing, and
wherein the guide base is configured to guide the chain on only one side of the guide base with respect to a line passing through centers of the rotatable rollers such that the chain is configured to move on only the one side of the guide base with respect to the line passing through the centers of the rotatable rollers.

2. The chain guide according to claim 1, wherein the remote end portion is between one of the roller bearings at the other of the two opposite ends of the guide base and the center of the guide base in the longitudinal direction such that the one of the roller bearings at the other of the two opposite ends is outside of the remote end portion.

3. A chain guide comprising:
a guide base having a curved shape, and being mounted along a direction in which a chain for transmitting torque is configured to move; and
a plurality of rotatable rollers mounted to the guide base so as to be spaced apart from each other in a longitudinal direction of the guide base,
wherein supporting members support two respective end portions of the guide base such that the rotatable rollers can guide the chain by rolling,
wherein at least one of the supporting members is between one of the rotatable rollers at one of two opposite ends of the guide base which is on a side of the at least one of the supporting members, and a center of the guide base in the longitudinal direction such that the one of the rotatable rollers is outside of the at least one of the supporting members,
wherein each of the rotatable rollers comprises a roller bearing, and
wherein the guide base is configured to guide the chain on only one side of the guide base with respect to a line passing through centers of the rotatable rollers such that the chain is configured to move on only the one side of the guide base with respect to the line passing through the centers of the rotatable rollers.

4. The chain guide according to claim 1, wherein the guide base is configured to satisfy the formula "H>W", where W is a distance between two opposite side surfaces of the guide base, and H is a radial height of the guide base.

5. A chain transmission device comprising:
a driving sprocket;
a driven sprocket;
a timing chain having a loose side chain portion, and being trained around the driving sprocket and the driven sprocket; and
a pivotable chain guide on one side of the loose side chain portion so as to guide a movement of the timing chain,
wherein the pivotable chain guide comprises:
a guide base having a curved shape, and being mounted along a direction in which the timing chain is configured to move; and
a plurality of rotatable rollers mounted to the guide base so as to be spaced apart from each other in a longitudinal direction of the guide base,
wherein one end portion of the guide base is supported by a fulcrum shaft such that the guide base is pivotable about the fulcrum shaft,
wherein a remote end portion of the guide base, which is remote from the fulcrum shaft, is configured to receive an adjustment force from a chain tensioner such that the rotatable rollers press the timing chain, and can guide the timing chain by rolling,
wherein the fulcrum shaft is between one of the rotatable rollers at one of two opposite ends of the guide base that is closer to the fulcrum shaft than the other of the two opposite ends of the guide base, and a center of the guide base in the longitudinal direction such that the one of the rotatable rollers is outside of the fulcrum shaft,
wherein each of the rotatable rollers comprises a roller bearing, and
wherein the guide base is configured to guide the timing chain on only one side of the guide base with respect to a line passing through centers of the rotatable rollers such that the timing chain is configured to move on only the one side of the guide base with respect to the line passing through the centers of the rotatable rollers.

6. The chain guide according to claim 2, wherein the guide base is configured to satisfy the formula "H>W", where W is a distance between two opposite side surfaces of the guide base, and H is a radial height of the guide base.

7. The chain guide according to claim 3, wherein the guide base is configured to satisfy the formula "H>W", where W is a distance between two opposite side surfaces of the guide base, and H is a radial height of the guide base.

8. The chain guide according to claim 1, wherein roller receiving recesses are defined between two opposite side surfaces of the guide base.

9. The chain guide according to claim 8, wherein each of the roller receiving recesses has opposed inner side surfaces with respective engaging portions supporting respective end portions of one of the rotatable rollers.

10. The chain guide according to claim 9, wherein each of the engaging portions includes a tapered groove section having a first end and a second end which is narrower than the first end, and a shaft supporting section communicating with the narrow end of the tapered groove section.

11. The chain guide according to claim 3, wherein roller receiving recesses are defined between two opposite side surfaces of the guide base.

12. The chain guide according to claim 11, wherein each of the roller receiving recesses has opposed inner side surfaces with respective engaging portions supporting respective end portions of one of the rotatable rollers.

13. The chain guide according to claim 12, wherein each of the engaging portions includes a tapered groove section having a first end and a second end which is narrower than the first end, and a shaft supporting section communicating with the narrow end of the tapered groove section.

14. The chain transmission device according to claim 5, wherein roller receiving recesses are defined between two opposite side surfaces of the guide base.

15. The chain transmission device according to claim 14, wherein each of the roller receiving recesses has opposed inner side surfaces with respective engaging portions supporting respective end portions of one of the rotatable rollers.

16. The chain transmission device according to claim 15, wherein each of the engaging portions includes a tapered groove section having a first end and a second end which is narrower than the first end, and a shaft supporting section communicating with the narrow end of the tapered groove section.

17. The chain guide according to claim 5, wherein the remote end portion is between one of the roller bearings at the other of the two opposite ends of the guide base and the center of the guide base in the longitudinal direction such that the one of the roller bearings at the other of the two opposite ends is outside of the remote end portion.

* * * * *